US009875114B2

(12) United States Patent
Temporelli et al.

(10) Patent No.: US 9,875,114 B2
(45) Date of Patent: Jan. 23, 2018

(54) METHOD, COMPUTER READABLE MEDIUM AND DEVICE FOR THE CONFIGURATION OR MAINTENANCE OF A COMPUTER SYSTEM IN A CLUSTER

(71) Applicant: BULL SAS, Les Clayes sous Bois (FR)

(72) Inventors: Frédéric Temporelli, Echirolles (FR); Christian Cotte-Barrot, Vaulnaveys-le-Haut (FR)

(73) Assignee: BULL SAS, Les Clayes-sous-Bois (FR)

(*) Notice: Subject to any disclaimer, the term of this patent is extended or adjusted under 35 U.S.C. 154(b) by 25 days.

(21) Appl. No.: 14/550,600

(22) Filed: Nov. 21, 2014

(65) Prior Publication Data

US 2015/0149758 A1 May 28, 2015

(30) Foreign Application Priority Data

Nov. 22, 2013 (FR) ..................................... 13 61549

(51) Int. Cl.
*G06F 9/44* (2006.01)
*G06F 9/445* (2006.01)

(52) U.S. Cl.
CPC .............. *G06F 9/4416* (2013.01); *G06F 8/60* (2013.01); *G06F 9/44505* (2013.01)

(58) Field of Classification Search
CPC ........................... G06F 9/4416; G06F 9/44505
USPC .................................................... 717/168–69
See application file for complete search history.

(56) References Cited

U.S. PATENT DOCUMENTS 5,404,527 A 4/1995 Irwin et al.
6,266,809 B1 * 7/2001 Craig ................... G06F 9/4416 717/173
6,317,826 B1 * 11/2001 McCall ................. G06F 9/4416 713/1
7,363,480 B1 * 4/2008 Righi ........................ G06F 8/65 709/219
2003/0177208 A1 * 9/2003 Harvey, IV ............. G06F 8/665 709/221
2004/0049670 A1 3/2004 Miyamoto et al.
2006/0020779 A1 * 1/2006 Rothman ............. G06F 9/4401 713/2

(Continued)

FOREIGN PATENT DOCUMENTS

GB 2329266 A 3/1999

OTHER PUBLICATIONS

INPI, Preliminary Search Report, dated Sep. 26, 2014, for French Application No. 1361549, corresponding to the subject application.

*Primary Examiner* — Kim Huynh
*Assistant Examiner* — Kevin Stewart
(74) *Attorney, Agent, or Firm* — Pillsbury Winthrop Shaw Pittman LLP

(57) ABSTRACT

The configuration and maintenance of a computer system in a cluster, where the computer system is configured to allow booting from data stored in an administration computer system is disclosed. In one aspect, after obtaining a boot disk image making it possible to boot an operating system and configuration data from the administration computer system, the operating system is booted and configured and a virtual storage disk is created. The configuration data received are analyzed in order to obtain and store in the virtual disk a program for the configuration of the computer system. The program for the configuration of the computer system is then executed.

13 Claims, 4 Drawing Sheets

400
402
408 Configuring the administration node
Configuring client node BIOS 410
414 Transferring IP config. and PXE server
Requesting IP config. and PXE server 412
418 Transmitting PXELINUX
Requesting PXELINUX 416
422 Transferring DOS image and parameters
Requesting DOS image and parameters 420
404
Storing DOS image, launching OS, creating virtual disk 424
428 Transferring config. script
Requesting config. script 426
Launching config. script 430
434 Transferring config. programs
Requesting config. programs 432
Storing config. programs in virtual disk 436
406
Configuration 438
442 Receiving script result
Transmitting script result 440

(56) References Cited

U.S. PATENT DOCUMENTS

2006/0036832 A1* 2/2006 Makiyama .............. G06F 9/455
712/1
2007/0277169 A1* 11/2007 Rao ........................... G06F 8/65
717/173
2010/0169709 A1* 7/2010 Chiu ................... G06F 11/1433
714/16
2012/0311556 A1* 12/2012 Matsukawa ............. G06F 8/665
717/171

* cited by examiner

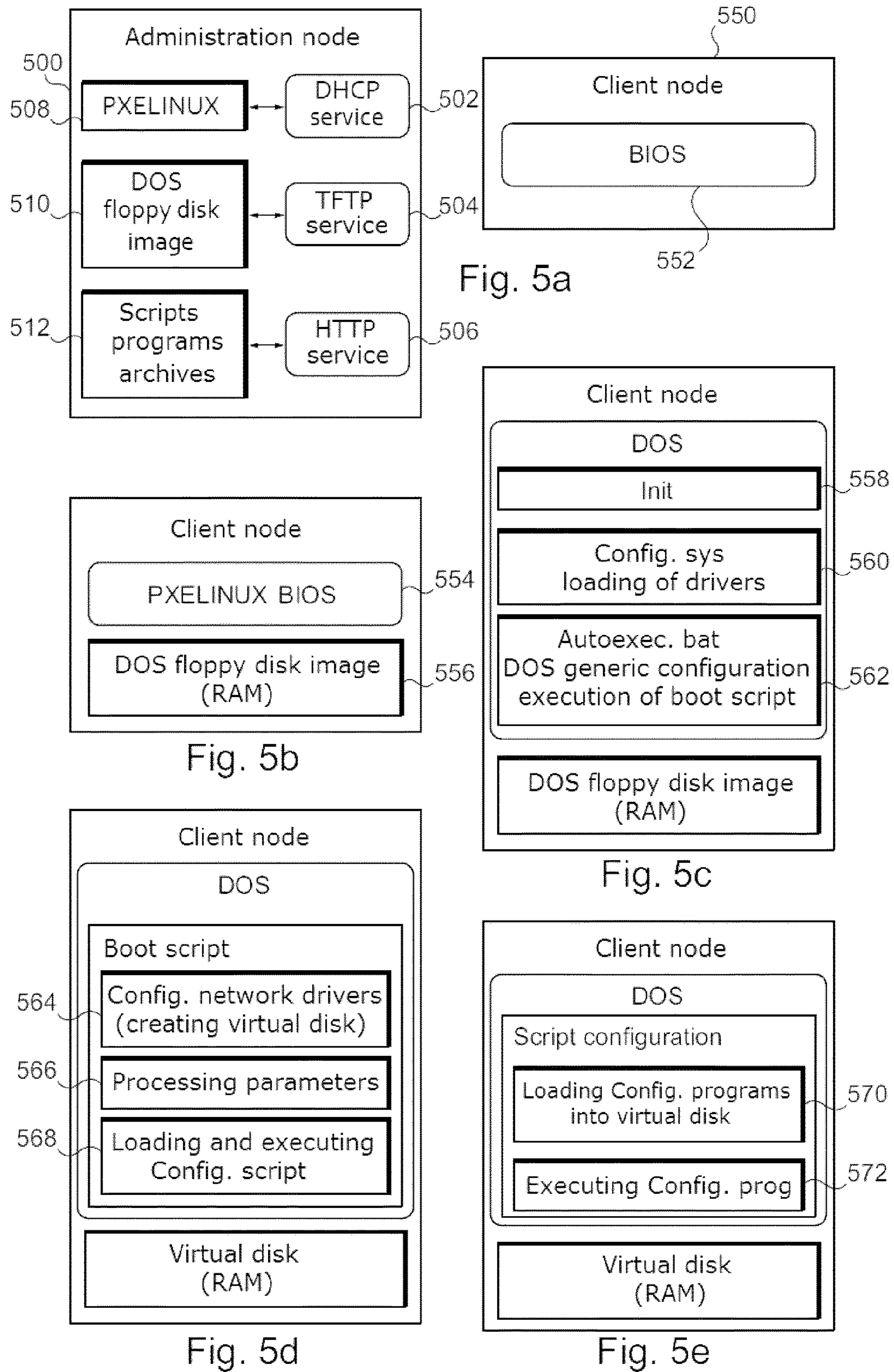

Administration node
500
508
PXELINUX
DHCP service
502
510
DOS floppy disk image
TFTP service
504
512
Scripts programs archives
HTTP service
506
550
Client node
BIOS
552
Fig. 5a
Client node
PXELINUX BIOS
554
DOS floppy disk image (RAM)
556
Fig. 5b
Client node
DOS
Init
558
Config. sys loading of drivers
560
Autoexec. bat DOS generic configuration execution of boot script
562
DOS floppy disk image (RAM)
Fig. 5c
Client node
DOS
Boot script
564
Config. network drivers (creating virtual disk)
566
Processing parameters
568
Loading and executing Config. script
Virtual disk (RAM)
Fig. 5d
Client node
DOS
Script configuration
Loading Config. programs into virtual disk
570
Executing Config. prog
572
Virtual disk (RAM)
Fig. 5e

METHOD, COMPUTER READABLE MEDIUM AND DEVICE FOR THE CONFIGURATION OR MAINTENANCE OF A COMPUTER SYSTEM IN A CLUSTER

CROSS-REFERENCE TO RELATED APPLICATION

This application claims the benefit under 35 U.S.C. §119 (a)-(d) of French Application No. 1361549, filed on Nov. 22, 2013 and entitled "Procédé, programme d'ordinateur et dispositif de configuration ou de maintenance d'un systéme informatique dans un cluster". The above cited patent application is incorporated herein by reference in its entirety.

BACKGROUND

Technological Field

The present application relates to the configuration and maintenance of computer systems and more particularly a method, a computer readable medium and a device for the configuration or maintenance of a computer system in a cluster, making versatile use of an operating system that uses only the random access memory (RAM) of the computer system on which it operates.

Description of Related Technology

High performance computation, also known as HPC (abbreviation for High Performance Computing), is being developed both for research in universities and for industry, in particular in technical fields such as the automotive, aeronautical, power, climatology and life sciences fields. Modeling and simulation make it possible in particular to reduce the development costs and to bring innovative products that are more reliable and more energy-efficient to the market more quickly. For researchers, high performance computing has become an indispensable research tool.

These computations are generally implemented on data processing systems called clusters (sometimes referred to as "server clusters" or "server farms"). A cluster typically comprises a set of computer systems implemented in interconnected nodes. Certain nodes are typically used for performing computation tasks (computation nodes), others for data storage (storage nodes), and one or more others manage the cluster (administration nodes). Each node is for example a server running an operating system such as Linux (Linux is a trade mark). The connection between the nodes is achieved for example by utilizing Ethernet communication links and interconnecting networks (for example Infiniband) (Ethernet and Infiniband are trade marks).

FIG. 1 shows schematically an example of a topology 100 of a cluster, of the fat-tree type. The latter comprises a set of nodes generically referenced 105. The nodes belonging to the set 110 are computation nodes while the nodes of the set 115 are service nodes (storage nodes and administration nodes). The computation nodes can be grouped in subsets 120 called computation islands, the set 115 being called a service island.

The nodes are linked to each other by switches, for example hierarchically. In the example shown in. FIG. 1, the nodes are connected to first-level switches 125 which are themselves linked to second-level switches 130 which are in turn linked to third-level switches 135.

The purpose of the boot process of a computer system is to obtain an operating system that can be accessed via a permanent or removable storage peripheral, which then makes it possible to load and execute application programs. This operating system is obtained by means of a simpler program called a bootloader, executed using the Basic Input Output System (BIOS) generally contained in a read only memory of the motherboard of the computer system.

During this boot phase, all the essential software components that are necessary for the operation of the computer system are loaded into random access memory.

An example architecture for a computer system belonging to a cluster is shown in FIG. 2.

The device 200 contains a communication bus 202 allowing data exchange with elements external to the device 200 (input/output bus) and a communication bus 204 dedicated to data exchange with a memory.

A read only memory 206 (Read Only Memory (ROM), or Electrically-Erasable Programmable Read-Only Memory (EEPROM)) containing the BIOS program of the system as well as a random access memory (RAM) 208 comprising registers suitable for recording variables and parameters created and modified during the execution of programs as well as an operating system (typically comprising at least one node and one file system) are connected to the bus 204.

One or more microprocessors or central processing units (CPU) 210 as well as a communication interface 212 suitable for transmitting and receiving data over a network are connected to the buses 202 and 204. The communication interface 212 comprises an expansion ROM 214, which contains a program allowing the operating system to be booted over a communication network.

It is noted that there is a boot process known as Pre-boot eXecution Environment (PXE) or open source version of PXE (gPXE) capable of use for loading software components into the random access memory 208 from a remote storage device, via a communication network.

The communication buses 202 and 204 allow communication and interoperability between the different elements included in the device 200 or linked thereto. The representation of the buses is non-limitative and, in particular, the central processing units are capable of communicating instructions to any element of the device 200 directly or via another element of the device 200.

In order to be executed, the executable code stored, for example, in the ROM 206 or in the expansion ROM 214 is typically loaded into the RAM 208.

Thus, the central processing units 210 command and direct the execution of the instructions or portions of software code of the program(s) which are stored in the random access memory 208 from the expansion ROM 214, the ROM 206 or any other, local or remote storage element.

Some important tasks for the configuration and maintenance of computer systems, for example updating the BIOS and modifying Desktop Media Interface (DMI) fields, comprising information such as the serial numbers of machines, when a read only memory of the EEPROM type is used, require an operating environment of the Disk Operating System (DOS) type.

In fact, although there are other environments for these configuration and maintenance operations, these environments have drawbacks, in particular in terms of cost. While the cost of tools of the DOS type are typically included with the licence of the BIOS, paid for each machine, it is generally necessary to acquire specific licences for the configuration and maintenance tools used in other environments, for example in the Linux environment. Such licences can exceed ten dollars annually per machine. As a result, the costs for a cluster can reach several tens of thousands of dollars annually.

However, the size of the data and of the programs used for the execution of configuration and maintenance tasks for computer systems no longer permits the use of floppy disk type storage media, the storage capacity of which (typically of the order of 1.4 Mb) is too small. As a result, the execution of configuration and maintenance tasks for computer systems in a DOS-type environment typically requires a support of the Universal Serial Bus (USB) key type, a hard disk, a Compact Disc—Read Only Memory (CD-ROM) or Digital Versatile Disc—Read Only Memory (DVD-ROM). Although offering advantages, such support is difficult to maintain, for example for adding an update of a new BIOS, and requires manual intervention, machine by machine, which is not easily compatible with use in server farms or clusters.

SUMMARY OF CERTAIN INVENTIVE ASPECTS

The invention makes it possible to solve at least one of the aforementioned problems.

In an embodiment there is a method for the configuration of a client computer system in a cluster comprising a plurality of computer systems at least one of which is an administration computer system, the computer systems of the plurality of computer systems being connected via a network, the client computer system being configured to allow booting from data stored in the administration computer system, the method comprising, obtaining an image of a boot media, typically of a boot disk, making it possible to boot an operating system of the DOS type and obtaining configuration data from the operating system, the boot media image and the configuration data being received from the administration computer system via the network;

booting and configuration of the operating system, the booting and configuration comprising creating a virtual storage disk, the size of the storage space in the virtual disk being preferably greater than the size of the boot media, for example 10 to 1,000 times greater;

analyzing the configuration data received and, in response, obtaining at least one program for the configuration of the client computer system, the at least one program for the configuration of the client computer system being received from the administration computer system via the network and stored in the virtual storage disk; and executing the at least one program for the configuration of the client computer system.

The method thus makes it possible to facilitate operations for the configuration and maintenance of computer systems in a cluster, in particular when the size of the boot media image used does not allow the configuration and maintenance tools to be stored thereon.

According to a particular embodiment, the method further comprises obtaining an automation script allowing the at least one program for the configuration of the client computer system to be obtained and executed, the automation script being obtained from the administration computer system.

Still according to a particular embodiment, the method further comprises executing at least one first command from the automation script in order to obtain the at least one program for the configuration of the client computer system and executing at least one second command from the automation script in order to execute the at least one program for the configuration of the client computer system.

Still according to a particular embodiment, the method further comprises configuring at least one from the client computer system and administration computer system.

Still according to a particular embodiment, the method further comprises loading a bootstrap loader program, the bootstrap loader program comprising instructions for the execution of obtaining a boot media image making it possible to boot a DOS-type operating system and to obtain data for the configuration of the operating system.

Still according to a particular embodiment, the method further comprises transmission of a result of execution of the at least one program for the configuration of the client computer system.

Still according to a particular embodiment, the method further comprises obtaining a boot script, the configuring the operating system being carried out in response to the execution of a command from the boot script.

Still according to a particular embodiment, the boot media image making it possible to boot a DOS-type operating system and the configuration data of the operating system are obtained via the network according to a protocol of the Trivial File Transfer Protocol (TFTP) type and according to which the at least one program for the configuration of the client computer system is obtained via the network according to a protocol of the HyperText Transfer Protocol (HTTP) type.

In another embodiment there is a non-transitory computer readable medium encoded with instructions adopted to direct a processor to carry out the method previously described when the instructions are executed on a computer as well as a device comprising means suitable for carrying out the method previously described.

The advantages procured by the computer readable medium and the device are similar to those mentioned above.

BRIEF DESCRIPTION OF THE DRAWINGS

Further advantages and features of the method, computer readable medium and device will become apparent from the detailed description below, given as a non-limitative example, in relation to the attached drawings, in which:

FIG. 5, comprising FIGS. 5*a* to 5*e*, shows schematically the state of an administration computer system and of a client computer system during the execution of the algorithm 400 shown in FIG. 4.

DETAILED DESCRIPTION OF CERTAIN ILLUSTRATIVE EMBODIMENTS

Figure 1:
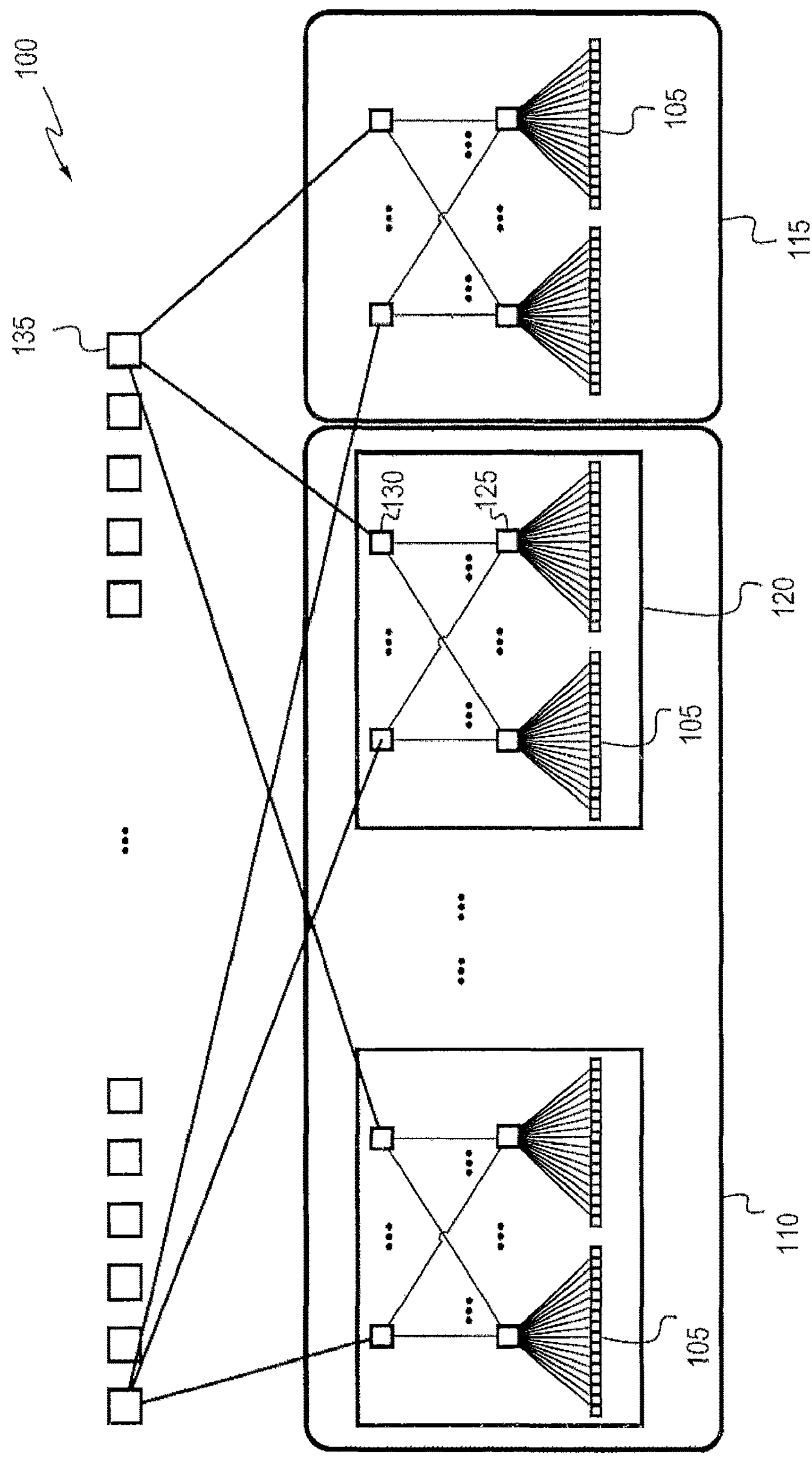
FIG. 1 is a diagram showing an example of the topology of a cluster.

According to an embodiment, a DOS environment is deployed, via a network, in one or more computer systems of a cluster comprising a set of computer systems, also called nodes, for carrying out configuration and maintenance tasks.

For these purposes, the cluster comprises an administration computer system, commonly called administration server, configured to supply information to computer systems in which configuration or maintenance tasks can be carried out. Typically, the administration computer system comprises a bootloader such as a PXE bootloader for supplying addresses, files and boot parameters (for example via a Dynamic Host Configuration Protocol (DHCP) server), a server of the Trivial File Transfer Protocol (TFTP) type for supplying boot and configuration files and a server of the HyperText Transfer Protocol (HTTP) type for archiving scripts and configuration and maintenance programs.

The administration computer system comprises in addition standard network services and offers network boot functions to computer systems of the cluster. The administration computer system can be distributed over several administration computer systems.

It is noted that a DHCP server distributes network addresses to client computer systems (it supplies the address of the client, the address of the gateway and of the name server). It can also give other information to clients, in particular TFTP server addresses and the names of files that client computer systems can download. A TFTP server can supply the files necessary for booting an operating system as well as a program loaded, in general by the network card, for initializing the environment before the operating system is booted.

Still according to an embodiment, a computer system of the cluster loads into memory, during its booting, from the administration computer system and via the network by utilizing a protocol of the PXE type, a DOS floppy disk image configured according to the method. After this image has been loaded, the computer system launches the execution of the DOS operating system stored in this image.

The network functionalities of the DOS operating system, e.g., typically, the network card driver and the Internet Protocol (IP) address are configured, via a DHCP server.

Advantageously, the DOS operating system is configured to exploit the "high memory" of the computer system, thus making it possible to provide a memory the size of which can reach 4 Gb and thus generate a large virtual disk in random access memory, for example a virtual disk of 512 Mb.

After its launch and initialization, the operating system obtains a bootstrap loader program (or script), stores it in the storage space of the virtual disk and launches its execution. This bootstrap loader program analyzes parameters configured on boot and transmitted by the administration server. In particular, the bootstrap loader program extracts from the boot parameters the information making it possible to load, from the administration computer system or another server, a file containing the program to be executed in the DOS environment. This may be, for example, a program for updating the BIOS. This program is loaded via the network and stored in the previously created virtual disk.

The bootstrap loader program finishes by launching the program to be executed in the DOS environment.

It is noted that it is generally possible to parameterize the BIOS in order, for example, to define the order of the peripherals to be polled so as to detect a boot zone. It is thus possible to boot a computer system via a network by obtaining an image of the operating system available on a remote storage system in the network. Such a boot process is in particular known as PXE or open source version of PXE (gPXE) (capable of use in a network of the InfiniBand or Ethernet type).

In this procedure, in certain embodiments the specific components and directives for the execution of the operating system are obtained by loading different files.

When these files are loaded, in the form of images, the operating system can then be booted by executing the program contained in the image.

Figure 3:
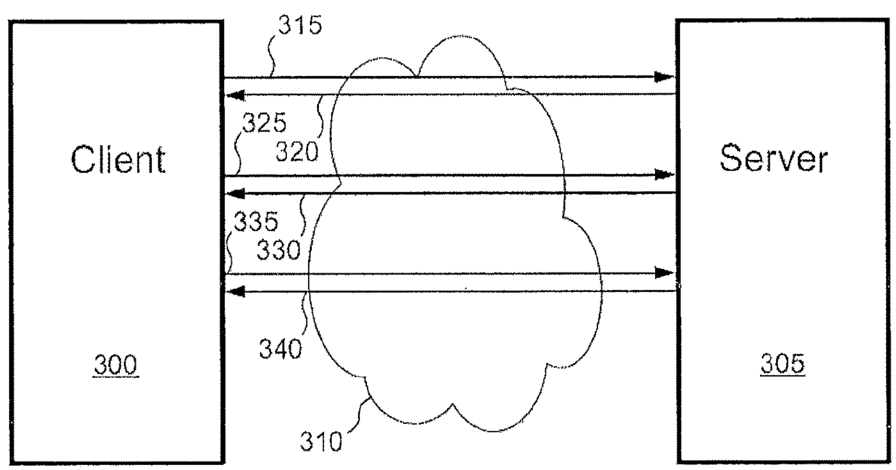
FIG. 3 is a diagram showing schematically a boot initialization sequence, according to the PXE protocol, between an administration computer system and a client computer system, for obtaining and launching an operating system from images accessible via a communication network.

FIG. 3 shows schematically a boot initialization sequence, according to the PXE protocol, between an administration computer system and a client computer system, for obtaining and launching an operating system from images accessible via a communication network.

As shown, a client computer system 300 is connected to a server 305 via a communication network 310. A first step, referenced 315, consists of retrieving an IP configuration on a DHCP server. Apart from the IP configuration information, the response 320 of the DHCP server indicates a location of a PXE directives file. The location of this directives file also makes it possible to define the transfer protocol to be used.

After having obtained an IP configuration from the DHCP server and a directives file location, the client transmits a request 325 to the server in order to implement the transfer of the located directives file. In response (referenced 330), the directives file is received from the server. Typically, the directives file received defines the location of a file corresponding to the image of the operating system and to the associated parameters.

The client then transmits a request 335 intended to obtain the file corresponding to the image of the operating system and to the associated parameters which are received from the server (reference 340) in response to this request.

It is observed that, within the context of the use of the PXE protocol, the file requests and transfers generally use the TFTP protocol.

After the files corresponding to the image of the operating system and to the associated parameters have been loaded into memory, the bootloader ends, by concatenating with the execution of the entry point of the operating system.

Thus, according to an embodiment, an administration computer system can be configured to allow network booting of computer systems according to a PXE boot mechanism using the DHCP and TFTP protocols and a tool known as PXELINUX. The latter is a program which forms part of the SYSLINUX project. It makes it possible to read a configuration file and launch an operating system by booting, in particular, from media images, typically floppy disks. The administration computer system is, in addition, advantageously configured for distributing files via the HTTP protocol.

According to an embodiment, a floppy disk image of the FreeDOS type is produced to allow booting of a minimal DOS operating system (1.44 Mb in size) with programs and a configuration allowing network access and providing a virtual disk such as a 512 Mb virtual disk. It is noted that FreeDOS is an open source operating system, compatible with the DOS operating system, and can be used in many environments, in particular in embedded systems.

After initialization of the operating system, the bootstrap loader program, which makes it possible to execute a configuration or maintenance program, is launched. This bootstrap loader program analyzes two variables obtained during the boot, one representing a Uniform Resource Locator (URL), according to, for example, the HTTP protocol, located on the administration machine, comprising the address of the configuration or maintenance program to be executed, and the other involving the name under which the configuration or maintenance program can be saved to the previously created virtual disk.

The bootstrap loader program then loads the configuration or maintenance program according to the determined URL and saves it to the virtual disk according to the determined name. After it has been saved, the execution of the configuration or maintenance program is launched by the bootstrap loader program.

It is observed that, according to an embodiment, the set of commands available in the DOS environment is minimal but allows the configuration or maintenance program to load additional commands and data from the administration computer system.

Alternatively, it is possible to use compressed archives stored in the image of the operating system, with the commands and data, the minimal DOS system then being provided with an archive decompression command.

By utilizing a virtual disk, after booting of the operating system, the client computer system has a much larger storage capacity than the standard capacity of a floppy disk, for example from 10 to 1,000 times greater than that of a floppy disk. It can be reconfigured very easily by modifying the parameters obtained during the boot (typically from the PXE boot) and/or from the program and configuration or maintenance data which are not to be encapsulated in an image file. In addition, it relies on reliable and robust technologies (HTTP) and can be utilized in machines that do not have a disk.

Figure 4:
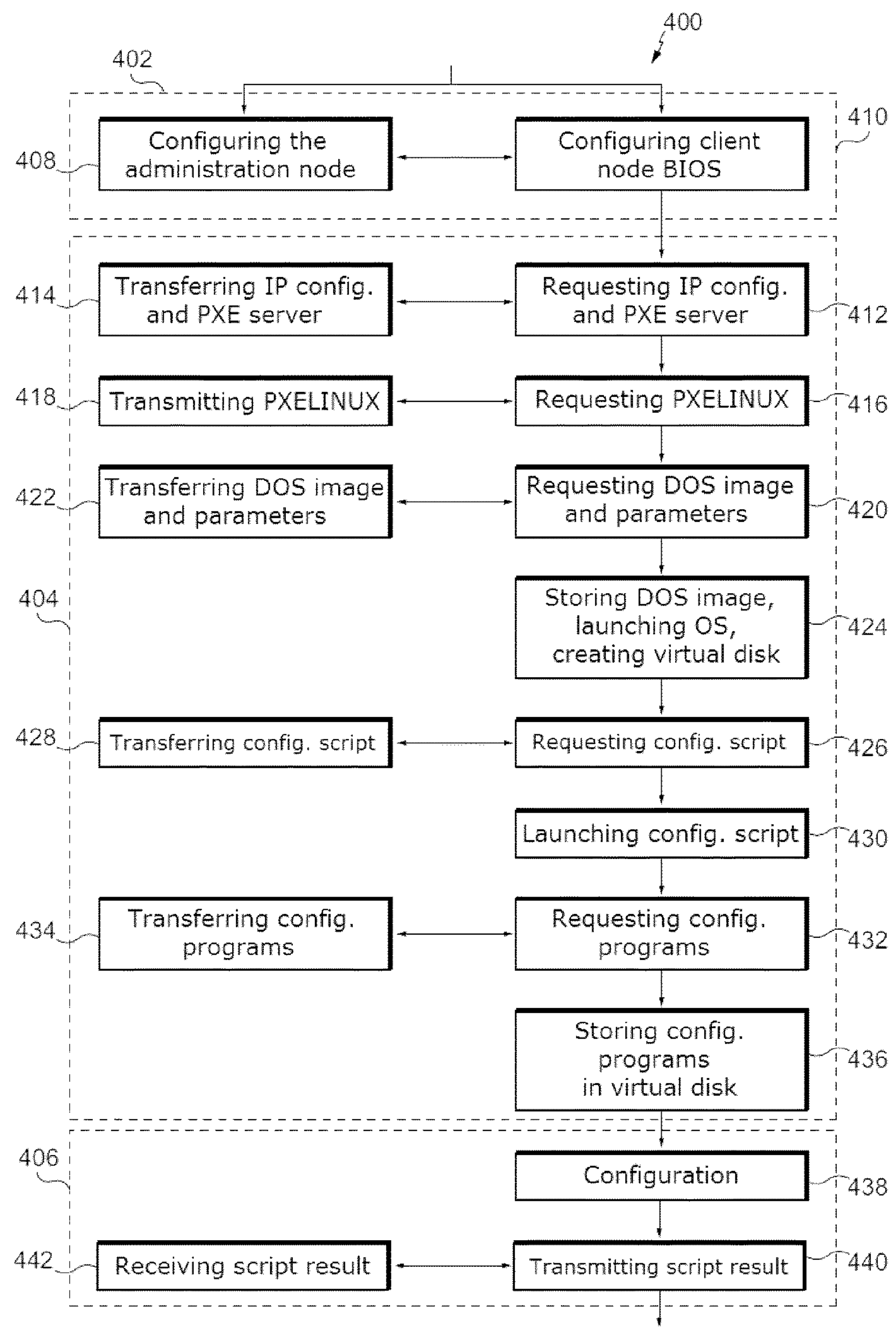
FIG. 4 is a diagram showing a portion of an example algorithm for the booting and configuration of a computer system of a cluster according to an embodiment.

FIG. 4 shows certain steps of a boot and configuration algorithm 400 of a computer system (or node) of a cluster according to an embodiment. The steps shown in the left-hand part of the figure are implemented by an administration computer system (or administration node) while the steps shown in the right-hand part are implemented by a client computer system (or client node) in which a configuration or maintenance function can be carried out.

Figure 2:
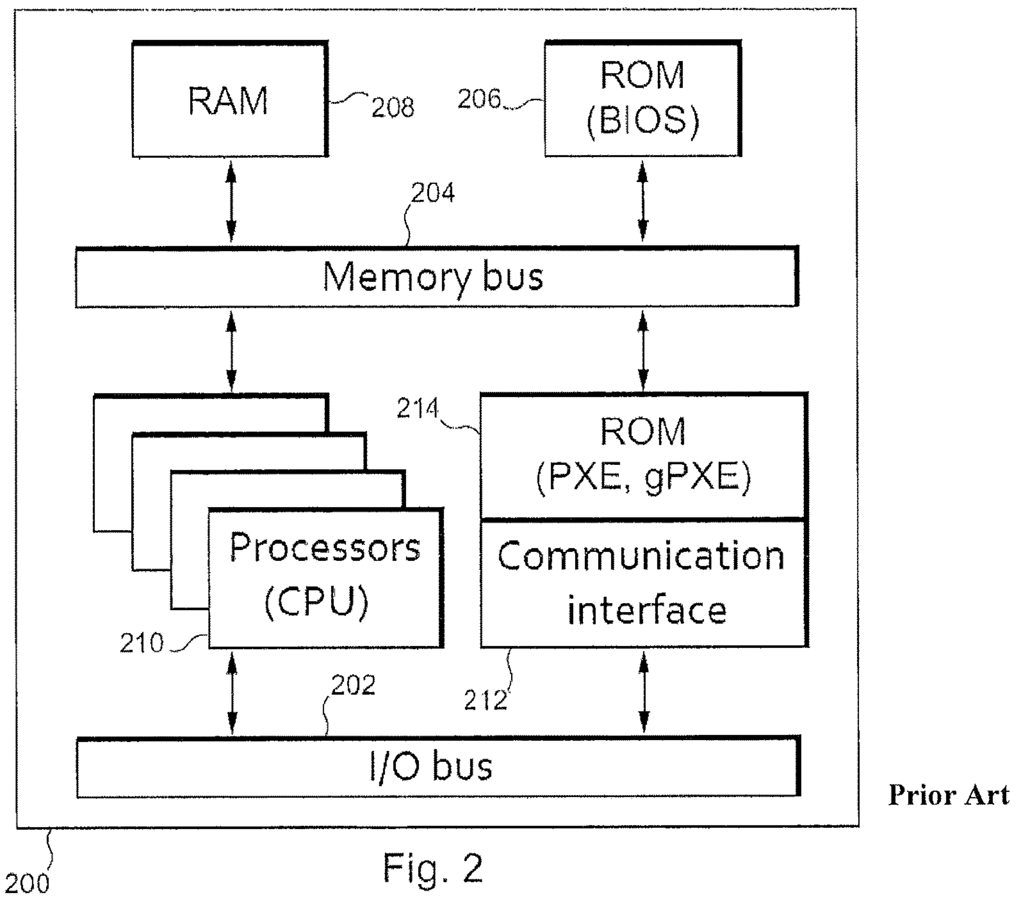
FIG. 2 is a diagram showing an example of the architecture of a computer system of a cluster.

The architecture of the administration and client nodes implementing these steps is, for example, in accordance with that described with reference to FIG. 2.

FIG. 5, comprising FIGS. 5*a* to 5*e*, shows schematically the state of an administration node and a client node during the execution of the algorithm 400 shown in FIG. 4.

As shown in FIG. 4, the boot and configuration algorithm 400 of a client node comprises three main phases: a phase 402 of preparation of the nodes, a phase 404 of loading and booting and a phase 406 of configuration or maintenance of a node.

The phase 402 of preparation of the nodes comprises in particular a step 408 of configuration of the administration node and a step 410 of configuration of at least one client node in which a configuration or maintenance operation can be carried out.

The purpose of step 408 is in particular, to configure DHCP, TFTP and HTTP services as well as to store files and parameters to be downloaded by client nodes, for example network and PXE parameters, the PXELINUX tool, a DOS floppy disk image file and scripts and programs allowing the execution of configuration and maintenance programs.

Step 410 is intended essentially to configure the BIOS of the client node in which a configuration or maintenance function can be carried out for the purpose, in particular, of allowing this node to boot via a network.

FIG. 5*a* shows an example of an administration node 500 and a client node 550 configured following the execution of steps 408 and 410.

As shown, the administration node 500 is configured to offer DHCP 502, TFTP 504 and HTTP 506 services allowing, in particular, the transfer of the PXELINUX tool 508, a DOS floppy disk image file 510 and scripts and programs 512 allowing the execution of configuration and maintenance programs, respectively. The BIOS 552 of the client node 550 is configured to allow, in particular, this node to boot via a network.

Following the preparation phase (phase 402), the client node in which a configuration or maintenance operation can be carried out sends a request to the administration node (step 412) in order to obtain an IP configuration, via the DHCP service. Apart from the IP configurations information, the client node receives information from the administration node on the location of a PXE directives file and of the PXELINUX tool (step 414). The location of this directives file and of this tool also makes it possible to define the transfer protocol to be used, the TFTP protocol.

After obtaining an IP configuration from the DHCP server and information on the location of the directives file and of the PXELINUX tool, the client node transmits a request to the administration node in order to implement the transfer of this file and this tool (step 416). In response to this request, the administration node transmits a PXE directives file and the PXELINUX tool to the client node (step 418).

The client node then transmits a request (step 420) involving obtaining the file corresponding to the image of the DOS operating system to be launched and to the associated parameters which are received from the administration node (step 422) in response to this request. The file corresponding to the image of the DOS operating system to be launched and the associated parameters are stored in the random access memory of the client node (step 424).

FIG. 5*b* shows the state of the client node, executing instructions from the BIOS and the PXELINUX tool (reference 554) after receiving and storing in random access memory the file corresponding to the image of the DOS operating system to be launched and the associated parameters (reference 556).

It is observed that the file transfers preferably utilize the TFTP protocol which is generally used within the context of use of the PXE protocol.

After obtaining and storing the image of the operating system the latter is initialized, the drivers are loaded, for example via the file known as config.sys, and the operating system is configured generically in order to be launched by utilizing, for example, the file known as autoexec.bat. A boot script, obtained with the DOS floppy disk image, is then launched in order to configure the operating system according to a particular embodiment.

As shown in FIG. 5*c*, after loading into memory the files corresponding to the operating system image and the associated parameters, the bootloader ends by concatenating with the execution of the entry point of the previously obtained DOS operating system. Following an initialization step (reference 558), the drivers are loaded (reference 560) then the operating system is configured and the boot script for configuring the operating system is launched (reference 562).

The boot script makes it possible to configure the drivers in order to configure the network, create a virtual disk in random access memory, for example a virtual disk of 100 Mb, and process bootstrap parameters received in the PXE directives in order to obtain information, in particular location information, from an automation script allowing the execution of configuration and maintenance programs.

Thus, after obtaining information concerning an automation script allowing the execution of configuration and maintenance programs, the client node sends a request to the administration node in order to obtain this automation script (step 426). This automation script is, preferably, obtained via the HTTP protocol (step 428). After it has been received, it is executed (step 430).

FIG. 5*d* shows the state of the client node after launching the boot script used for configuring the operating system. As described previously and as shown in FIG. 5*d*, the boot script makes it possible to configure the drivers, typically to configure the network driver and create a virtual disk in random access memory (reference 564) and process bootstrap parameters received in the PXE directives in order to obtain information on the location of an automation script allowing the execution of configuration and maintenance programs (reference 566). It also makes it possible to load this automation script and execute it (reference 568).

The automation script allowing the execution of configuration and maintenance programs comprises instructions for loading these programs (steps 432 and 434), storing them locally in the virtual disk (step 436) and executing them (step 438) in order to configure the client node or execute a maintenance operation.

By way of illustration, the automation script allowing the execution of configuration and maintenance programs can comprise an instruction for loading, utilizing the HTTP protocol and in compressed form, a BIOS update program called afudos.zip. After it has been obtained, this program is decompressed and stored in the virtual disk under the name afudos.exe.

Similarly, the automation script allowing the execution of configuration and maintenance programs can comprise an instruction for loading, utilizing the HTTP protocol and in compressed form, a BIOS configuration file called X9DRTH2.zip. After it has been obtained, this file is decompressed and stored in the virtual disk under the name X9DRTH2.602.

The automation script allowing the execution of configuration and maintenance programs can then comprise a command for executing the program afudos.exe with the parameters contained in the X9DRTH2.602 file for updating the BIOS according to predetermined parameters.

A result of execution of the automation script allowing the execution of configuration and maintenance programs, for example a result of updating the BIOS, is, preferably, transmitted to the administration node (steps 440 and 442).

FIG. 5*e* shows the state of the client node after execution of the configuration or maintenance programs according to the automation script allowing the execution of these programs. As described previously and as shown in FIG. 5*e*, the execution of the automation script allowing the execution of the configuration or maintenance programs loads the latter into the virtual disk (reference 570) and launches their execution (reference 572).

Naturally, to meet specific requirements, a person skilled in the field of the embodiments could make changes to the above description.

The embodiments have been described and illustrated in the present detailed description with reference to the attached figures. However, the present invention is not limited to the embodiments presented. Other variants, combinations of features and embodiments are possible and can be deduced and implemented by the person competent in the field of the embodiments on reading the present description and the attached figures.

In the claims, the term "comprised" does not exclude other elements or other steps. The indefinite article "a" does not exclude the plural. The different features presented and/or claimed can advantageously be combined. Indeed, their presence in the description or in different dependent claims does not exclude the possibility of combining them. The reference marks are not to be understood as limiting the scope of the invention.

The invention claimed is:

1. A method of configuration of a client computer system in a cluster comprising a plurality of computer systems at least one of which is an administration computer system, the computer systems of the plurality of computer systems being connected via a network, the client computer system being configured to allow booting from data stored in the administration computer system, the method, comprising:

obtaining a boot media image making it possible to boot an operating system of the DOS type and obtaining configuration data from the operating system, the boot media image and the configuration data being received from the administration computer system via the network, wherein the boot media image includes a boot script;

booting and configuration of the operating system, wherein the booting and configuration comprises creating a virtual storage disk via execution of the boot script;

analyzing the configuration data received and, in response, obtaining at least one program for the configuration of the client computer system, the at least one program for the configuration of the client computer system being received from the administration computer system via the network, after receiving the boot media image and the configuration data, and stored in the virtual storage disk, wherein the analysis of the configuration data comprises identification of a network address of the at least one program and identification of at least one name for the at least one program; and executing the at least one program for the configuration of the client computer system.

2. The method according to claim 1, further comprising obtaining an automation script allowing the at least one program for the configuration of the client computer system to be obtained and executed, the automation script being obtained from the administration computer system.

3. The method according to claim 2, further comprising executing at least one first command from the automation script in order to obtain the at least one program for the configuration of the client computer system and executing at least one second command from the automation script in order to execute the at least one program for the configuration of the client computer system.

4. The method according to claim 1, further comprising preliminarily step of configuring at least one of the client computer system and the administration computer system.

5. The method according to claim 1, further comprising initially loading a bootstrap loader program, the bootstrap loader program comprising instructions for the execution of the steps for obtaining a boot media image making it possible to boot a DOS-type operating system and to obtain data for the configuration of the operating system.

6. The method according to claim 1, further comprising transmitting a result of execution of the at least one program for the configuration of the client computer system.

7. The method according to claim 1, wherein the configuring of the operating system is carried out in response to the execution of a command from the boot script.

8. The method according to claim 1, wherein the boot media image making it possible to boot a DOS-type operating system and the configuration data of the operating system are obtained via the network according to a protocol of the TFTP type and according to which the at least one program for the configuration of the client computer system is obtained via the network according to a protocol of the HTTP type.

9. A non-transitory computer readable medium encoded with instructions adapted to direct a processor to carry out the method according to claim 1 when the instructions are executed on a computer.

10. A device in a cluster comprising a plurality of computer systems at least one of which is an administration computer system, the computer systems of the plurality of computer systems being connected via a network, the device being configured to allow booting from data stored in the administration computer system, the device comprising a processor configured to:

obtain a boot media image making it possible to boot an operating system of the DOS type and obtain configuration data from the operating system, the boot media image and the configuration data being received from the administration computer system via the network, wherein the boot media image includes a boot script;

boot and configure the operating system, wherein the processor is further configured to create a virtual storage disk during the boot and configure via execution of the boot script;

analyze the configuration data received and, in response, obtain at least one program for the configuration of the client computer system, the at least one program for the configuration of the client computer system being received from the administration computer system via the network, after receiving the boot media image and the configuration data, and stored in the virtual storage disk, wherein the analysis of the configuration data comprises identification of a network address of the at least one program and identification of at least one name for the at least one program; and execute the at least one program for the configuration of the client computer system.

11. A method of configuration of a client computer system in a cluster comprising a plurality of computer systems at least one of which is an administration computer system, the computer systems of the plurality of computer systems being connected via a network, the client computer system being configured to allow booting from data stored in the administration computer system, the method comprising:

obtaining a boot media image making it possible to boot an operating system of the DOS type, wherein the boot media image includes a boot script;

obtaining configuration data from the operating system, wherein the boot media image and the configuration data are received from the administration computer system via the network;

executing the boot script configured for creating a virtual storage disk;

obtaining at least one program for configuration of the client computer system based on the configuration data received, wherein the at least one program for the configuration of the client computer system is received from the administration computer system via the network, after receiving the boot media image and the configuration data, and stored in the virtual storage disk, wherein the obtaining of the at least one program is responsive to analysis of the configuration data, the analysis of which includes identification of a network address of the at least one program and identification of at least one name for the at least one program; and executing the at least one program for the configuration of the client computer system.

12. A non-transitory computer readable medium encoded with instructions adapted to direct one or more processors to carry out configuration of a client computer system in a cluster comprising a plurality of computer systems at least one of which is an administration computer system, wherein the computer systems of the plurality of computer systems are connected via a network and the client computer system is configured to allow booting from data stored in the administration computer system, when the following instructions are executed on the one or more processors to:

obtain a boot media image making it possible to boot an operating system of the DOS type, wherein the boot media image includes a boot script;

obtain configuration data from the operating system, wherein the boot media image and the configuration data are received from the administration computer system via the network;

execute a boot script configured for creating a virtual storage disk;

obtain at least one program for configuration of the client computer system based on the configuration data received, wherein the at least one program for the configuration of the client computer system is received from the administration computer system via the network, after receiving the boot media image and the configuration data, and stored in the virtual storage disk, wherein the obtainment of the at least one program is responsive to analysis of the configuration data, the analysis of which includes identification of a network address of the at least one program and identification of at least one name for the at least one program; and execute the at least one program for the configuration of the client computer system.

13. The method according to claim 1, wherein the configuration data includes preboot execution environment (PXE) directives.

* * * * *